United States Patent [19]
Yonenaga et al.

[11] Patent Number: 5,543,952
[45] Date of Patent: Aug. 6, 1996

[54] OPTICAL TRANSMISSION SYSTEM

[75] Inventors: Kazushige Yonenaga; Shigeru Kuwano; Nori Shibata, all of Kanagawa; Seiji Norimatsu, Tokyo, all of Japan

[73] Assignee: Nippon Telegraph and Telephone Corporation, Tokyo, Japan

[21] Appl. No.: 526,277

[22] Filed: Sep. 11, 1995

[30] Foreign Application Priority Data

Sep. 12, 1994 [JP] Japan .................................. 6-217612

[51] Int. Cl.$^6$ .................................................. H04B 10/04
[52] U.S. Cl. ........................ 359/181; 359/188; 375/291
[58] Field of Search .................................. 359/181, 184, 359/185, 186, 158, 183, 188; 372/26, 29, 30; 375/291, 304

[56] References Cited

U.S. PATENT DOCUMENTS 4,426,277  4/1984  Pommier .................................. 375/18

OTHER PUBLICATIONS

"Frequency Chirping in External Modulators," Journal of Lightwave Technology, vol. 6, No. 1, Jan. 1988, Fumio Koyama et al., pp. 87–93.
"Transmission Limitations of CPFSK Coherent Lightwave Systems Due to Stimulated Brillouin Scattering in Optical Fiber," Journal of Lightwave Technology, vol. 9, No. 9, Sep. 1991, Toshihiko Sugie, pp. 1145–1155.
"Phase–Mismatch Dependence of Efficiency of Wave Generation Through Four–Wave Mixing in a Single–Mode Optical Fiber," IEEE Journal of Quantum Electronics, vol. QE–23, No. 7, Jul. 1987, Nori Shibata et al., pp. 1205–1210.
"Duobinary Transmission with p–i–n F.E.T. Optical Receivers," Electronics Letters, vol. 16, No. 19, Sep. 11, 1980, pp. 752–753.
"10 Gbit/s Unrepeatered Three–Level Optical Transmission Over 100 km of Standard Fibre," Electronics Letters, vol. 29, No. 25, Dec. 9, 1993, X. Gu et al, pp. 2209–2211.
"Correlative Digital Communication Techniques," IEEE Transactions on Communication Technology, 1964, Adam Lender, pp. 128–135.
"Reduced Bandwidth Optical Digital Intensity Modulation with Improved Chromatic Dispersion Tolerance," Electronics Letters, vol. 31, No. 1, Jan. 5, 1995, A. J. Price et al., pp. 58–59.

*Primary Examiner*—Leo Boudreau
*Assistant Examiner*—Rafael Bacares
*Attorney, Agent, or Firm*—Nikaido, Marmelstein, Murray & Oram LLP

[57] ABSTRACT

In a transmitter side in an optical transmission system, an input binary signal is converted into a duobinary signal, and the duobinary signal is applied to an optical modulation device which provides an optical intensity modulation signal, wherein the optical intensity for a center value of the duobinary signal is a minimum, the optical intensity for the other two values of the duobinary signal is a maximum, and an optical phase for those two values is opposite to each other. In a receiver side, simple direct detection is carried out for receiving optical signal through an optical transmission line to provide a demodulated binary signal. Thus, an original binary signal is recovered without a duobinary decoder and receiver sensitivity degradation. In the optical transmission system, an optical carrier frequency component in a signal spectrum is suppressed, a signal bandwidth of the modulated light is reduced in half to that of a prior art, so an optical transmission system for long distance, high bit rate and large traffic capacity is obtained.

7 Claims, 16 Drawing Sheets

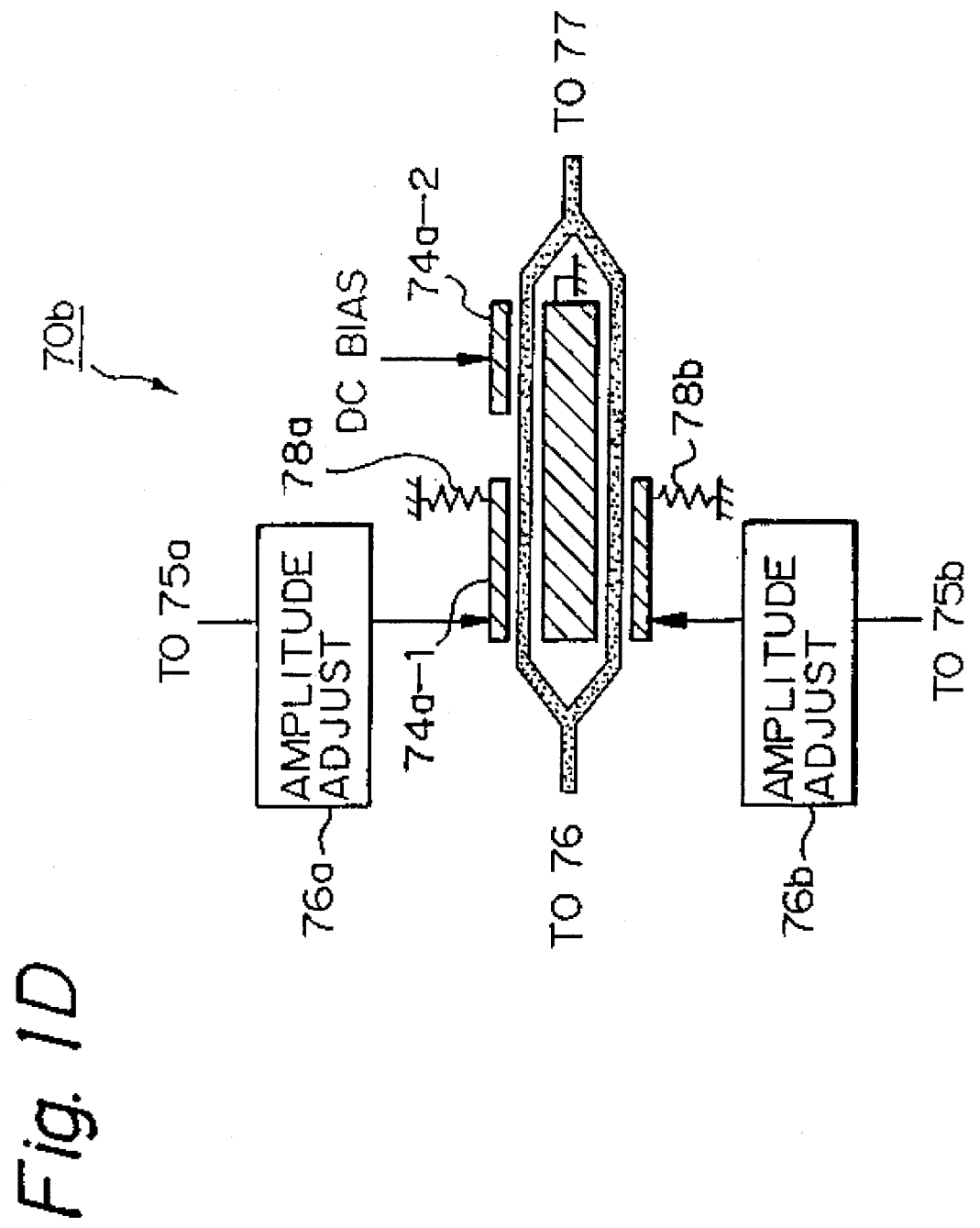

DUOBINARY SIGNAL WAVEFORM, AND RECEIVED SIGNAL WAVEFORM

DUOBINARY SIGNAL SPECTRUM

OPTICAL INTENSITY MODULATION
SIGNAL SPECTRUM

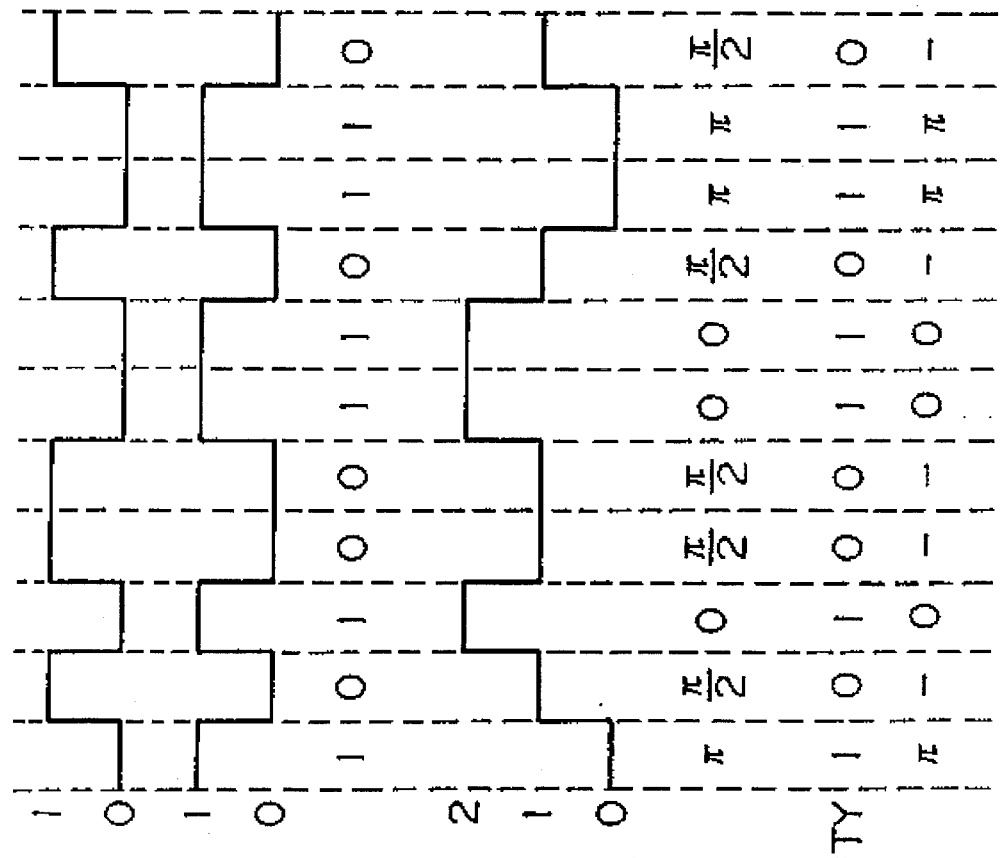

OPTICAL TRANSMISSION SYSTEM

BACKGROUND OF THE INVENTION

The present invention relates to a long-haul and large-capacity optical transmission system used in a long trunk line having large traffic capacity, in particular, relates to such a system which uses optical intensity modulation in a transmitter side.

In a simple optical transmission system, an optical intensity modulation system in transmitter side is used, and a direct detection system is used in receiver side. The direct detection system detects a received signal without using interference of coherent light from other source. That system is abbreviated to IM-DD system. Two modulation methods have been known in optical intensity modulation. One of them is a direct modulation in which an intensity of a semiconductor laser output is directly controlled, and the other is an external modulation in which an output beam of a semiconductor laser is modulated by using an optical intensity modulator.

A direct modulation system has the disadvantage of undue expand of spectrum because of undesirable frequency modulation which coincides with optical intensity modulation which is called chirping, and transmission quality is deteriorated due to chromatic dispersion of an optical fiber.

As for an external modulation system, many types of modulators have been proposed, and among them, a Mach-Zender interferometer type (MZ type) modulator has been widely used for high-speed and long-haul transmission systems, since it avoids essentially chirping.

FIG. 13 shows a prior optical transmission system using a MZ type optical intensity modulator in a transmitter. In the figure, a MZ type optical intensity modulator 70 has a coupler 71 dividing a light beam to a pair of branch waveguides 72a and 72b which provide a phase difference between light beams in those waveguides, and a coupler 73 which combines outputs of those waveguides so that optical intensity modulation is carried out. Optical intensity of the combiner output is high if phases in two waveguides 72a and 72b coincides with each other, and it is low if phases in two waveguides are opposite with each other. In a MZ type optical intensity modulator, transmittance or intensity of output light depends upon said phase difference which is controlled by potential or voltage applied to electrodes 74a and 74b along said branch waveguides, as shown in FIG. 14. In a prior binary IM-DD system, each of binary values (0 and 1) is assigned to the maximum transmittance point A and the minimum transmittance point B. In the configuration of FIG. 13, a binary input signal is separated to two signals with one signal applied to an inverter 75 so that a pair of complementary signals are obtained, so that those complementary signals are applied to electrodes 74a and 74b each related to branched waveguides 72a and 72b. In the above configuration, MZ type modulator operates in push-pull operation, so that undesirable chirping is completely removed (see F. Koyama and K. Iga, IEEE J. Lightwave Technol., vol.6, No. 1, pages 87–93, 1988).

An output beam of a semiconductor laser 76 in FIG. 13 is modulated by an MZ type modulator 70 which is driven by a pair of complementary signals, and modulated beam is forwarded to an optical transmission cable 77. In a receiver side, a modulated beam at output of the cable 77 is directly detected by an optical detection circuit 78. An output of the optical detection circuit 78 is decided by a decision circuit 79 to provide demodulated data signal.

It should be noted that an optical binary intensity modulation signal has spectrum as shown in FIG. 15, in which a large carrier frequency component exists, and spectrum expands up to twice of bit rate on both sides of carrier frequency. In FIG. 15, horizontal axis shows frequency with 1.2 GHz for each scale, and vertical axis shows power with 5 dB for each scale.

Said carrier frequency component is undesirable because of deterioration of transmission quality due to non-linear characteristics of an optical fiber, in particular, restriction of input power into an optical fiber due to stimulated Brillouin scattering (see T. Sugie, IEEE J. Lightwave Technol., vol.9, pages 1145–1155, 1991). Further, it causes the increase of crosstalk due to four-wave mixing in an optical wavelength-division multiplexed transmission system (see N. Shibata et al., IEEE J. Quantum Electron., vol. QE-23, pages 1205–1210, 1987). Further, the undue expansion of signal spectrum causes the deterioration of receiver sensitivity in long-haul and larvae capacity transmission system due to chromatic dispersion of an optical fiber, and/or the decrease of frequency utilizing efficiency due to crosstalk between optical wavelength channels. The effect of chromatic dispersion is not negligible in some channels because of dispersion slope even when disperison-shifted fiber is used in a long transmission line for wavelength-division multiplexed high-speed signal. Those problems restrict transmission distance, transmission rate, and/or trans, mission capacity, and therefore, those problems must be solved in developing an optical network.

For extending the transmission distance limited by chromatic dispersion, one solution for suppressing undue expansion of spectrum of an optical intensity modulation signal is the use of duobinary signal (see X.Gu and L. C. Blank, Electron. Lett. vol. 29, No. 25, pages 2209–2211, 1993).

FIG. 16 shows a prior optical transmission system using duobinary signal. In the figure, a binary data signal is converted to duobinary signal with an encoding circuit 80, which has a one-bit delay line (T) 81 and an exclusive-OR circuit (EXOR) 82 for differential encoding to provide a precoded sequence, and a low pass filter 87 for providing a duobinary signal from said precoded sequence. The low pass filter 87 for providing a duobinary signal doubles as a bandwidth restriction filter. An optical intensity modulator 85 modulates an optical carrier from the semiconductor laser with said duobinary signal which is an output of the encoding circuit 80, so that three-level intensity modulation signal is launched into an optical fiber cable 77. In a receiver side, an output signal of the optical fiber cable 77 is directly detected by an optical detection circuit 78. The output of the optical detection circuit is three-level signal, which is converted to binary signal by using a pair of decision circuits 79a and 79b, and original binary signal is recovered by EX-OR circuit 79c.

An optical transmission system using duobinary signal as shown in FIG. 16 has advantage that transmission quality is less deteriorated due to chromatic dispersion of an optical fiber, since spectrum bandwidth of optical signal is narrow. The effectiveness of that system has been confirmed in a 10 Gbit/s, 100 km transmission experiment using an MZ type optical intensity modulator (see X. Gu and L. C. Blank, Electron. Lett. vol. 29, No. 25, pages 2209–2211, 1993).

However, a prior optical three-level transmission system using duobinary code has the disadvantage that receiver sensitivity is degraded by approximate 3 dB as compared with that of a binary IM-DD transmission system, because of decrease of distance between signal points to be separated, since an optical signal is converted to electrical three-level signal (see X. Gu and L. C. Blank, electron. Lett. vol. 29, No. 25, pages 2209–2211, 1993). (Three values of a duobinary signals are assigned to the points A, B and C in FIG. 14, and so, the transmittance at the point C is half of that at point A). Further, in a receiver side, two decision circuits and an EX-OR circuit must be installed for recovering original binary signal from the detected three-level signal, and therefore the configuration of a receiver is complicated. Further, the spectrum has still carrier frequency component, as is the case of a binary intensity modulated signal, therefore, it has the disadvantages of restriction of input power into an optical fiber due to stimulated Brillouin scattering, and/or crosstalk due to four-wave mixing.

SUMMARY OF THE INVENTION

An object of the present invention is to overcome the disadvantages and limitations of a prior optical transmission system by providing a new and improved optical transmission system.

It is also an object of the present invention to provide an optical transmission system using a duobinary signal, suppressing carrier frequency component, and narrowing spectrum bandwidth to half of that of a prior system which uses a binary intensity modulated signal, without deterioration of receiver sensitivity and with simple configuration of a receiver, in order to provide an optical transmission system with high transmission rate and long distance.

The above and other objects are attained by an optical transmitter system having an input terminal receiving a binary data signal; an encoding circuit coupled with said input terminal for converting a binary data signal to a duobinary signal; an optical modulation means coupled with an output of said encoding circuit for providing optical intensity modulation to an optical carrier with said duobinary signal so that intensity of optical signal for a center value of said duobinary signal is the minimum and intensity of optical signal for other two values of said duobinary signal is the maximum, and phase of optical signal for those two values is opposite with each other; and an output terminal coupled with output of said optical modulation means to provide a modulated optical signal to an optical transmission line.

The optical transmission system comprises said optical transmitter system, an optical receiver system, and an optical transmission line coupling said transmitter system with said receiver system.

Preferably, said optical modulation means provides modulated output with level zero as said minimum output for said center value of said duobinary signal.

Preferably, said optical modulation means comprises an optical source for providing an optical carrier, a modulator driving signal generation means for providing a pair of complementary modulator driving signals having the same amplitude and opposite phase as each other according to a value of said duobinary signal, a Mach-Zehnder interferometer type optical intensity modulator for modulating said optical carrier with each of said modulator driving signals, so that said modulator modulates output of said optical source so that it is the minimum intensity when said modulator driving signal is at center value and it is the maximum intensity when said modulator driving signal is at other two values, and phase of an output light for those two values is opposite with each other.

One modification of said optical modulation means comprises an optical source for providing an optical carrier, an optical intensity modulator for switching ON and OFF said optical carrier according to inverted signal of original binary signal, an optical phase modulator for modulating output light of said optical intensity modulator according to said duobinary signal, so that optical intensity for a center value of said duobinary signal is the minimum and optical intensity for other two values of said duobinary signal is the maximum, and phase for those two values is opposite with each other.

Preferably, a low pass filter (LPF) is inserted at an input of said optical modulation means for restricting bandwidth of modulated light.

A receiver side comprises an optical detector for direct detection of received optical signal, a decision circuit for deciding detected binary signal, and an inverter for inverting the decided binary signal. Said optical detector is used in a prior binary IM-DD transmission system.

A detection system in a receiver side is not restricted to a direct detection, but a coherent detection which superimpose a local light on a received optical signal is possible.

According to the present invention, a binary data is first converted to a duobinary signal, so that a value 0 of a binary data is for instance converted to a value 0 or value 2 of a duobinary signal, and a value 1 of a binary data is converted to a value 1 of a duobinary signal. Optical intensities 1, 0, and 1 correspond to values 0, 1 and 2 of a duobinary signal. Optical phase for values 0 and 2 of a duobinary signal is opposite to each other. In other words, optical intensity for a center value of a duobinary signal is the minimum, and optical intensity for other two values of a duobinary signal is the maximum and optical phase for those two values is opposite with each other. In that configuration, the spectrum of a modulated light is the same as that of a baseband duobinary signal, which has no DC component (−1, 0, 1), but it is shifted to an optical frequency band. Therefore, the optical carrier frequency component is suppressed, and the bandwidth of the optical modulated signal is half of that of a binary intensity modulated signal.

Further, since intensity of an optical signal in the present invention has values of only 0 (OFF) and 1 (ON), a direct detector for a binary signal may be used in a receiver side. An inverter is installed in a receiver since an output of an optical modulator is OFF and ON for an original binary signal "1" and "0", respectively.

The optical intensity modulated signal in the present invention can be considered as a binary intensity modulated signal in a prior art if optical phase is ignored. So, the receiver sensitivity of the present invention is the same as that of a prior art, and it is not deteriorated.

Further, since a low pass filter in an input stage of an optical modulation means restricts bandwidth of a modulated light, tolerance to the chromatic dispersion is improved.

BRIEF DESCRIPTION OF THE DRAWINGS

The foregoing and other objects, features, and attendant advantages of the present invention will be appreciated as the same become better understood by means of the following description and accomanying drawings wherein;

FIG. 1D shows a modification of an optical intensity modulator in FIG. 1A, FIG. 12 shows driving signals for an optical intensity modulator and an optical phase modulator in the embodiment of FIG. 11A and FIG.11B.

DESCRIPTION OF THE PREFERRED EMBODIMENTS

Figure 1A:
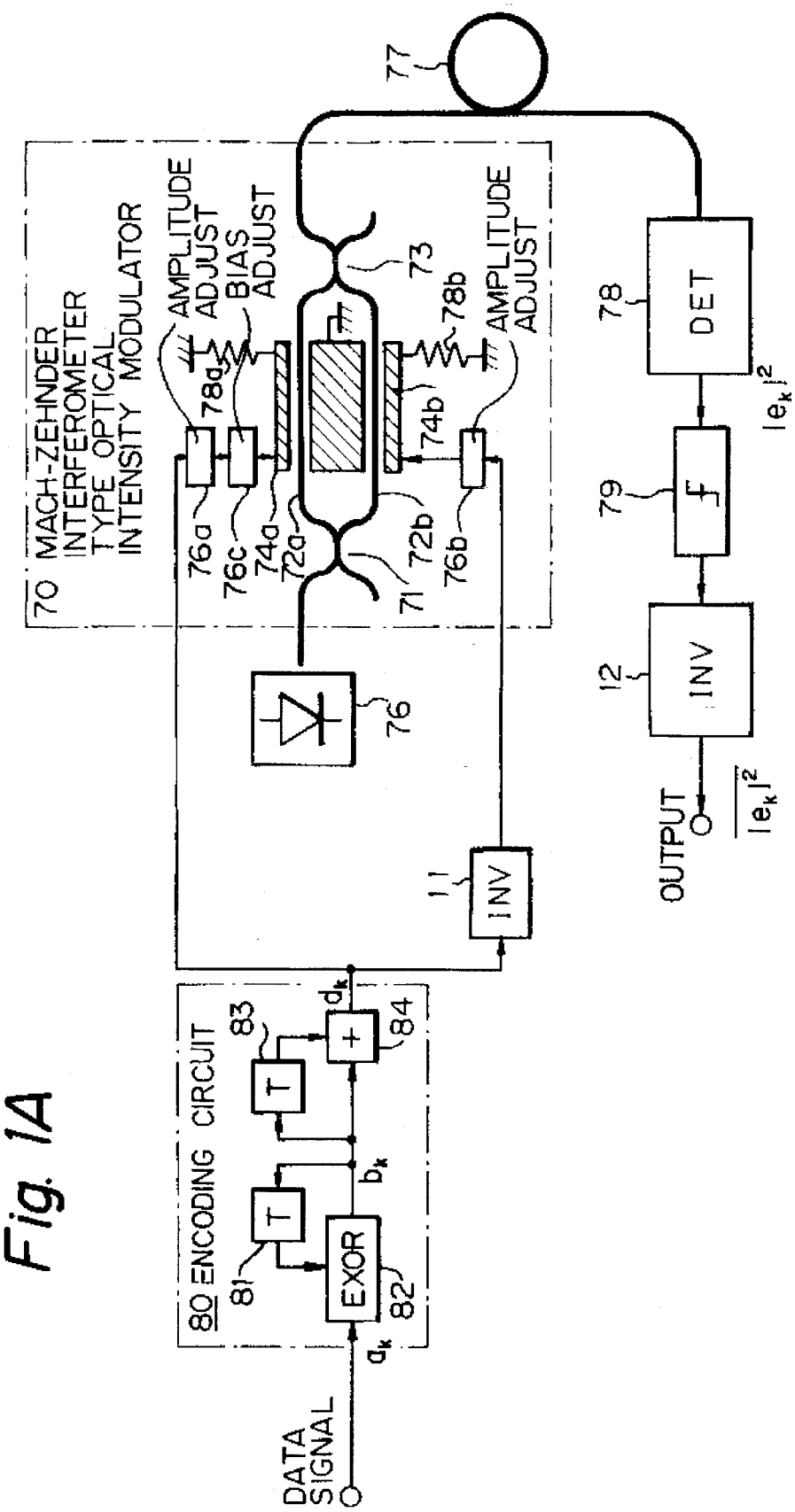
FIG. 1A shows a block diagram of an optical transmission system according to the present invention.

FIG. 1A shows a block diagram of an optical communication system according to the present invention, in which a dual drive MZ (Mach-Zehnder interferometer) type optical intensity modulator is used, where delay time in a pair of optical waveguides is adjusted independently by applying voltage on a pair of electrodes on said. waveguides. In the figure, a binary digital data signal at an input terminal is converted to a duobinary signal by an encoding circuit 80, which has a pair of one-bit delay lines (T) 81, 83, an exculsive-OR circuit (EXOR) 82, and an adder 84. A duobinary signal which has one of three values (0, 1, 2) is divided to two branches, one of which is applied to an inverter circuit 11 so that a pair of complementary duobinary signals having the same amplitude and opposite phase are obtained, and voltages proportional to said complementary duobinary signals with no DC component (−1, 0, 1) are applied on a pair of electrodes 74a and 74b on waveguides of a MZ type optical intensity modulator 70.

A semiconductor laser 76 generates a coherent light.

An output light of the semiconductor laser 76 is intensity-modulated by said pair of duobinary signals, and the modulated beam is launched into an optical fiber cable 77. In a receiver side, an optical intensity modulated signal from the optical fiber cable 77 is directly detected by an optical detection circuit 78. The detected signal is applied to an inverter 12 through a decision circuit 79, so theft demodulated data signal is obtained at an output terminal which is coupled with an output of the inverter 12.

The present invention has the feature that when optical intensity modulation by duobinary signal (0, 1, 2) is carried out, the bias voltage applied to the electrodes of the modulator is adjusted so that an output optical intensity is the minimum for the center value (1). In an ideal condition, it is preferable that an output intensity is zero for the center value (1). Further, a pair of voltages applied to a pair of electrodes 74a, 74b have the same absolute value as each other, and are equal to or less than the so-called half-wavelength voltage which changes phase of light by ¶ (pi), preferably, said peak-to-peak voltage is same as the half-wavelength voltage.

Figure 2:
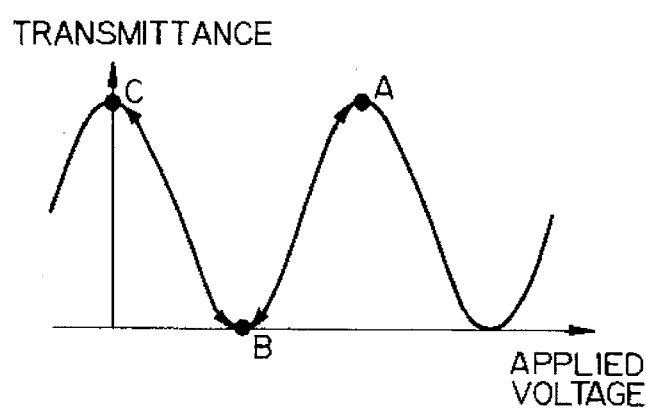
FIG. 2 shows operation of a Mach-Zehnder type optical intensity modulator in FIG. 1A.

FIG. 2 shows an embodiment of assignment of three signal points of duobinary signal (0, 1, 2) and transmittance of the MZ type modulator, where horizontal axis shows applied voltage to the electrodes and vertical axis shows transmittance of the MZ type modulator. Three values (0, 1, 2) of a duobinary signal are assigned to the point A of the maximum transmittance, the point B of the minimum transmittance, and the point C of the maximum transmittance. The, center value (1) of the duobinary signal is assigned to the point B which has the minimum transmittance (dark), and other two values (0 and 2) of the duobinary signal are assigned to the points A and C (bright). The modulated light at the points A and C have the same intensity (brightness), but have the opposite phase with each other.

In order to provide said relations, amplitude adjusting circuits 76a and 76b are provided for adjusting amplitude of duobinary signals so that amplitude of a pair of complementary duobinary signals are the the same as half-wavelength voltage, and a bias adjusting circuit 76c is provided for providing proper voltage to the electrode 74a so that center value of duobinary signal is assigned to the point B in FIG. 2. The electrodes 74a and 74b are grounded through resistors 78a and 78b, respectively.

Figure 1B:
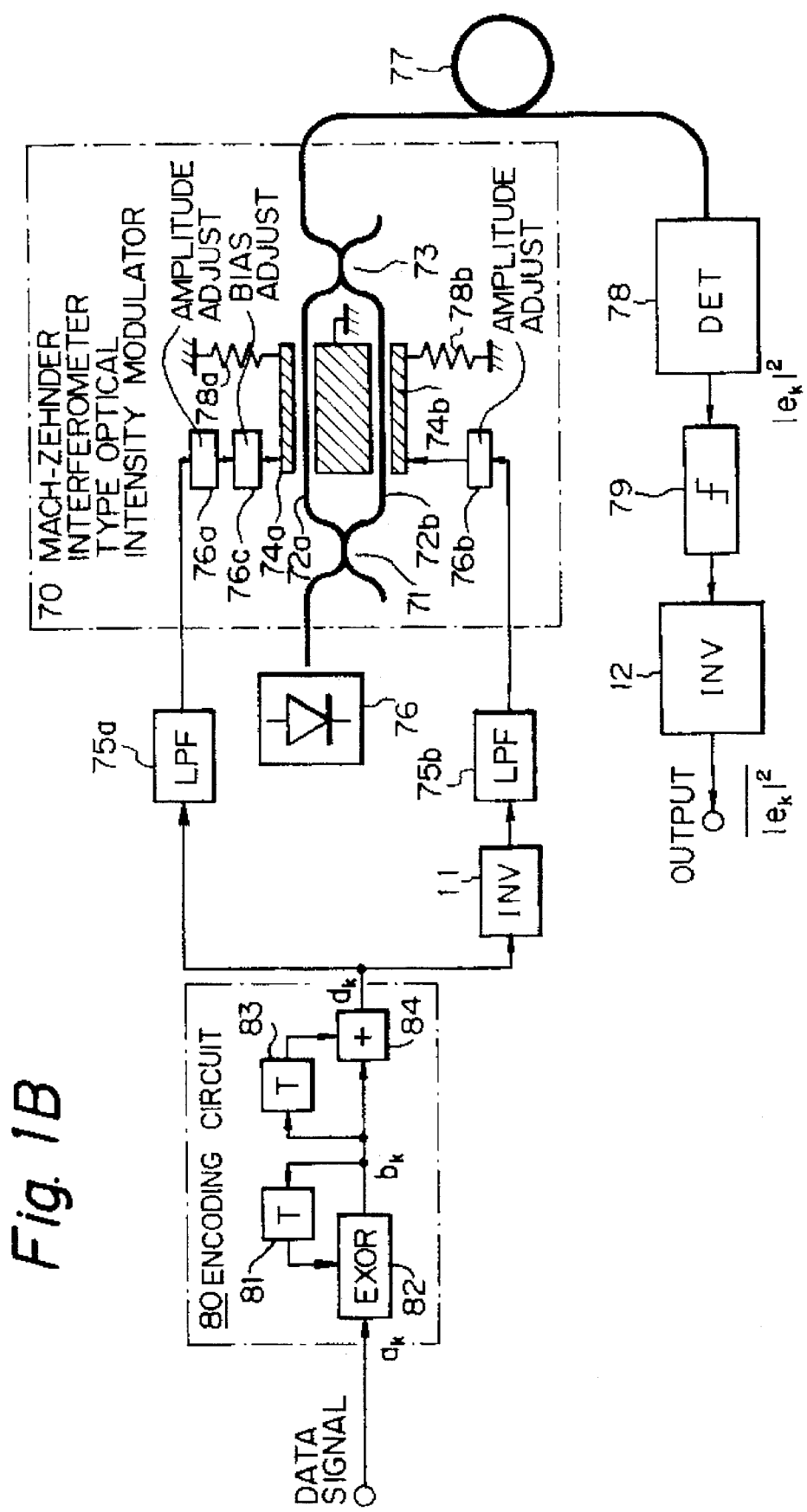
FIG. 1B shows a modification of an embodiment of FIG. 1A.
Figure 1C:
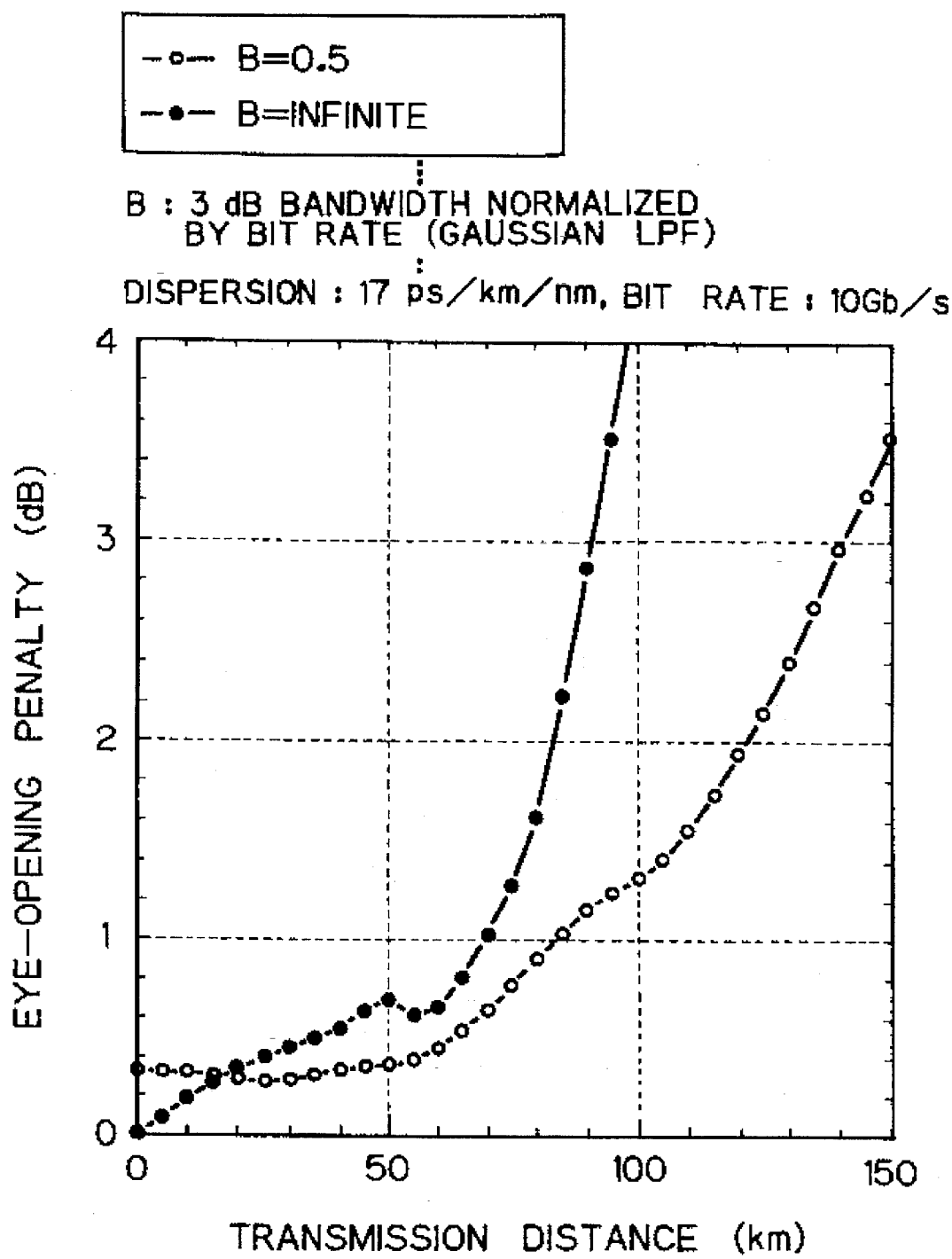
FIG. 1C shows characteristics curves of chromatic dispersion penalty of optical intensity modulated signal in the present invention.
Figure 16:
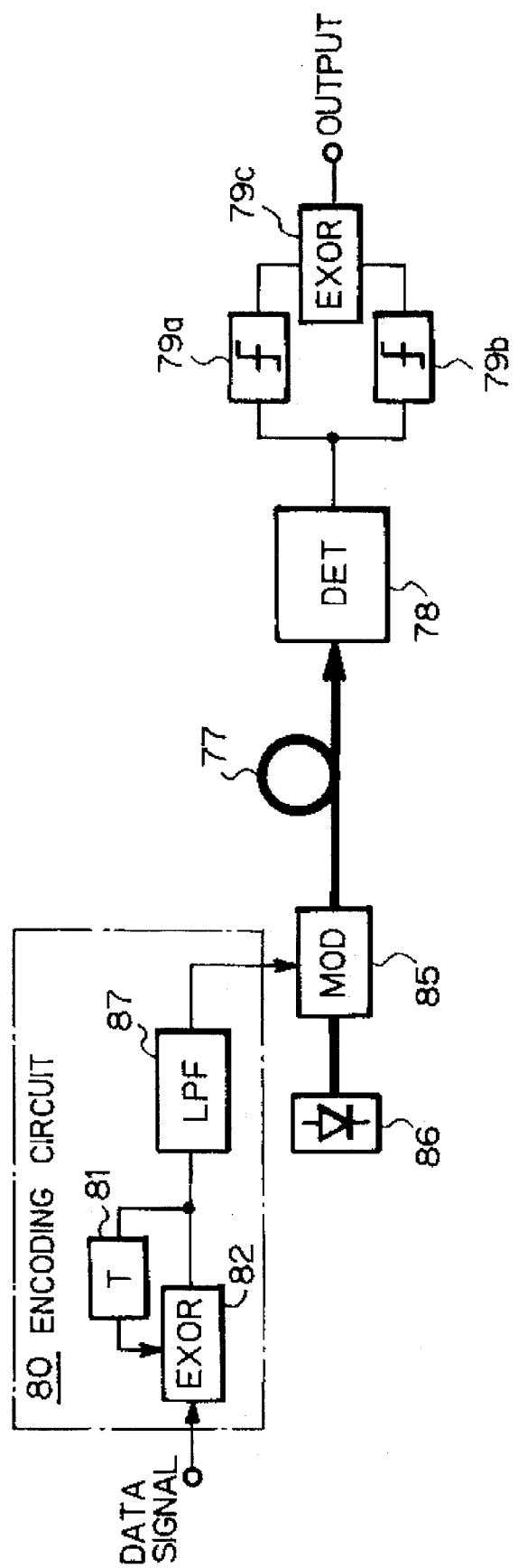
FIG. 16 shows a block diagram of another prior optical transmission system which uses a duobinary signal.

FIG. 1B shows a modification of FIG. 1A. The feature of FIG. 1B is the presence of low pass filters 75a and 75b inserted in respective branches for removing harmonics and restricting bandwidth of baseband signal for driving an optical modulator 70. In one modification, a single low pass filter inserted in an output of the encoding circuit 80 may be substituted for said pair of filters 75a and 75b. The pass band of those filters may be designed from zero to infinite. When the bandwidth of a signal for driving an optical modulator is restricted, the transmission distance is improved as shown in theoretical analysis in FIG. 1C, in which horizontal axis shows transmission distance in km, vertical axis shows eye-opening penalty (dB), bit rate is 10 Gb/s, dispersion of an optical fiber line is 17 ps/km/nm, the curve with white dots has bandwidth B=0.5 (3 dB bandwidth normalized by bit rate (Gaussian LPF)), and the curve with black dots has bandwidth B=infinite. It should be appreciated that the curve with white dots (B=0.5) restricting the bandwidth provides longer transmission distance than that of the black dots curve. When the encoding circuit 80 for providing duobinary signal has a low pass filter as shown in FIG. 16, the low pass filter 87 in an encoding circuit may double as low pass filters 75a and 75b which restrict the bandwidth of a duobinary signal. The use of an encoding circuit having a low pass filter in FIG. 16 is equivalent to the case that an ideal rectangular low pass filter having cutoff frequency equal to half of bit rate is used in FIG. 1B.

FIG. 1D shows a modification 70b of a Mach-Zehnder interferometer type intensity modulator, in which one of the electrodes is separated to 74a–1 and 74a–2 so that DC bias voltage is applied to the specific electrode 74a–2. In that case, a bias adjusting circuit 76C is not needed.

Figure 3:
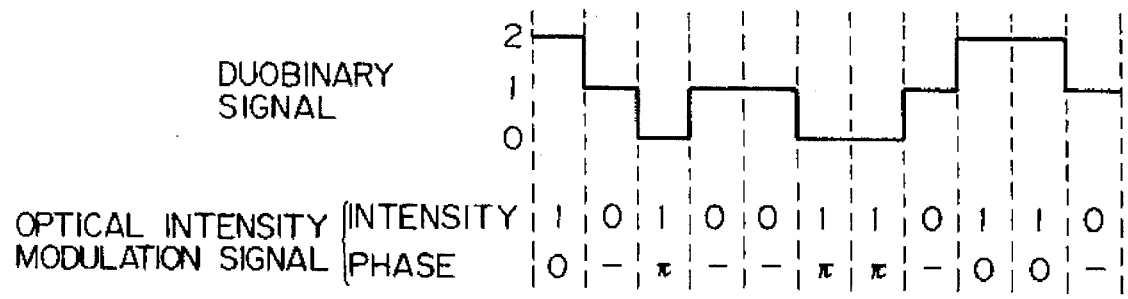
FIG. 3 shows relations between duobinary signal and an optical intensity modulated signal in the present invention.

FIG. 3 shows relations between duobinary signal, and optical intensity and phase of an intensity modulated signal in the present invention. The optical intensity has binary values, "1" (ON), and "0" (OFF), where the optical phase for the intensity "1" (ON) is "0" or "0"¶. It should be noted that duobinary signal has no direct transition between "0" and "2" and therefore, no transition occurs between the phase "0" and "¶" keeping the intensity of light.

Figure 4:
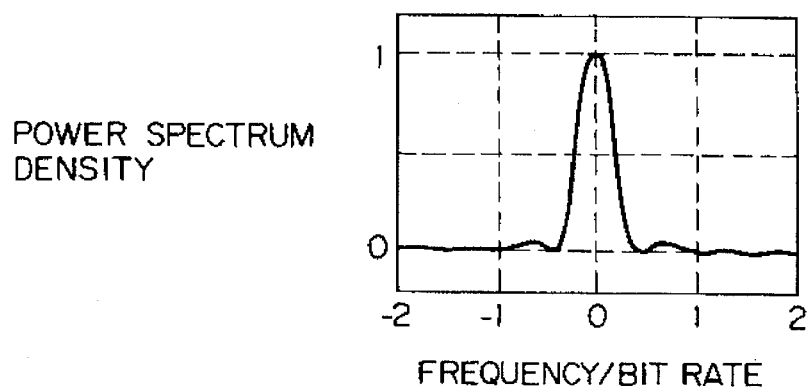
FIG. 4 shows a curve of power spectrum density of a duobinary signal.

FIG. 4 shows power spectrum of duobinary signal (–1, 0, +1), where no D.C. component exists, and almost all the signal power is concentrated within the half bandwidth of bit rate. An optical intensity modulated signal in the present invention is expressed by the product of a baseband duobinary signal with no DC component (–1, 0, +1) and an optical carrier. Power spectrum of optical intensity modulated signal in the present invention is obtained by shifting the baseband spectrum to optical carrier frequency. Therefore, a carrier frequency component of optical modulated signal in the present invention is suppressed, and signal power of the intensity modulated signal is concentrated within half the bandwidth of binary intensity modulation signal.

An optical intensity modulated signal thus obtained is demodulated to a binary data by direct detection with an optical detection circuit 78, decision by a decision circuits 79, and inversion by an inverter 12.

Table 1 shows the relations among (1) binary data signal $\{a_k\}$, (2) differential encoded signal $\{b_k\}$, (3) duobinary signal $\{d_k\}$, (4) inverted duobinary signal $\{d_k\}$, (5) intensity modulated signal $\{e_k\}$, (6) detected signal $\{|e_k|^2\}$ direct detection and (7) demodulated data signal $\{|e_k|^2\}$.

Figure 6:
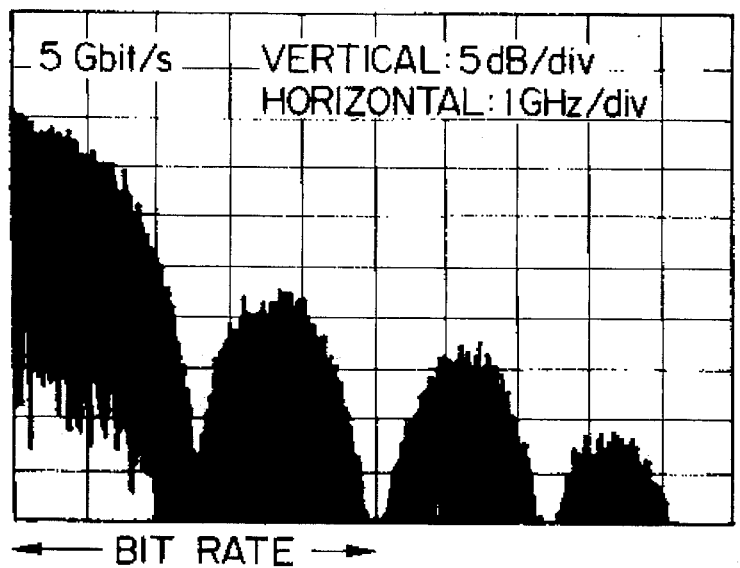
FIG. 6 shows spectrum of a duobinary signal.

FIG. 6 shows spectrum of duobinary signal, where it should be noted that almost all the signal power is concentrated within half bandwidth of bit rate.

Figure 7:
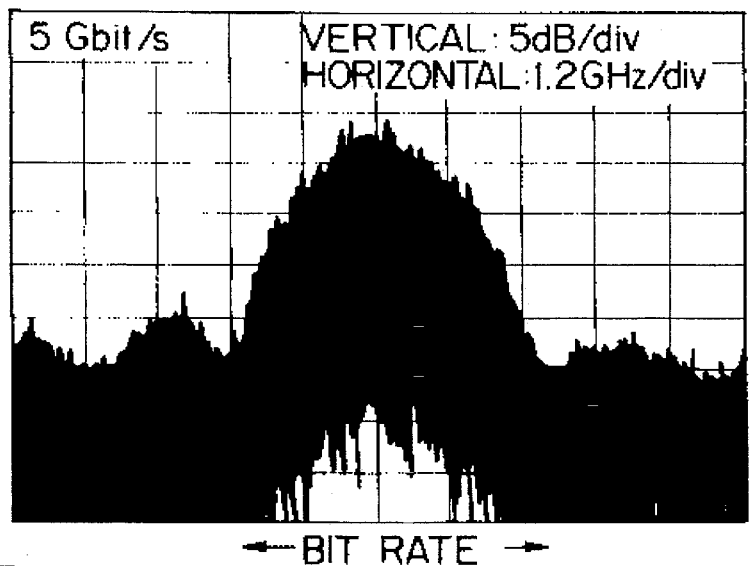
FIG. 7 shows spectrum of an optical intensity modulated signal in the present invention.
Figure 15:
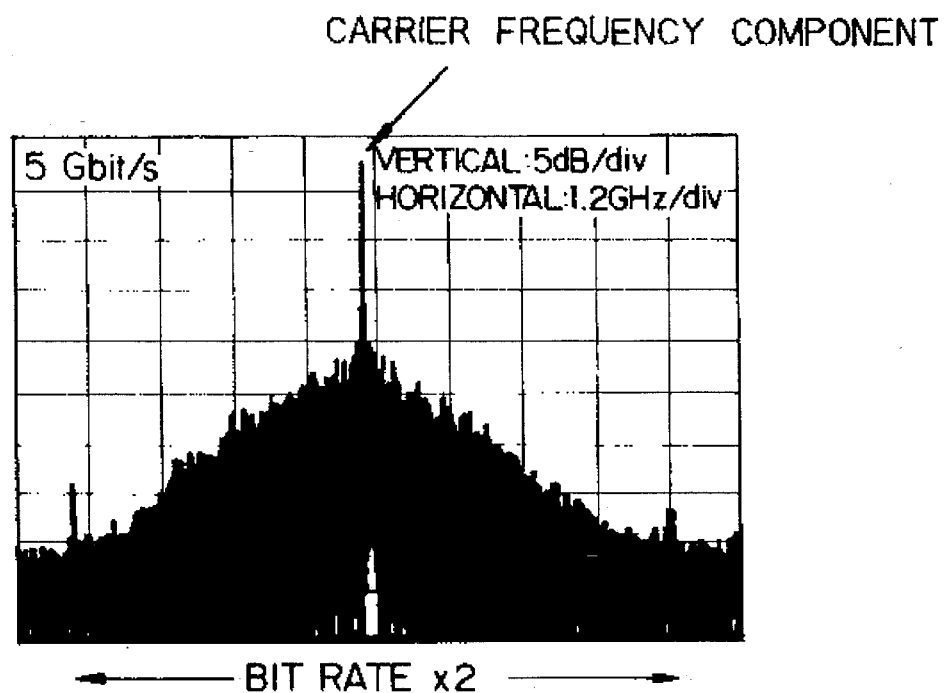
FIG. 15 shows spectrum of an optical intensity modulated signal in an optical binary transmission system in a prior art.

FIG. 7 shows spectrum of an optical intensity modulated signal in the present invention observed by optical heterodyne detection. It should be noted that carrier frequency component is suppressed, and bandwidth is half as compared with that of a binary signal in a conventional art (FIG. 15).

Figure 8:
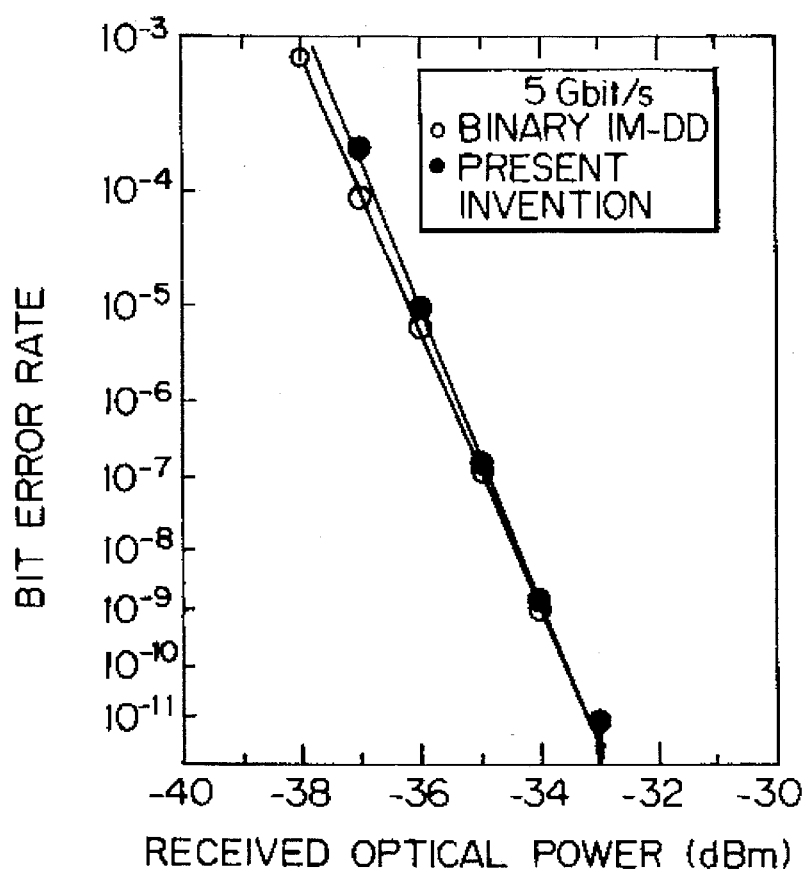
FIG. 8 shows bit error rate performance of the present invention, and a prior art.

FIG. 8 shows bit error rate performance of the present invention, and a prior art (binary IM-DD system). It should be appreciated that two curves are almost the same as each other, and therefore, the receiver sensitivity of the present invention is not deteriorated as compared with that of a prior art.

Figure 9A:
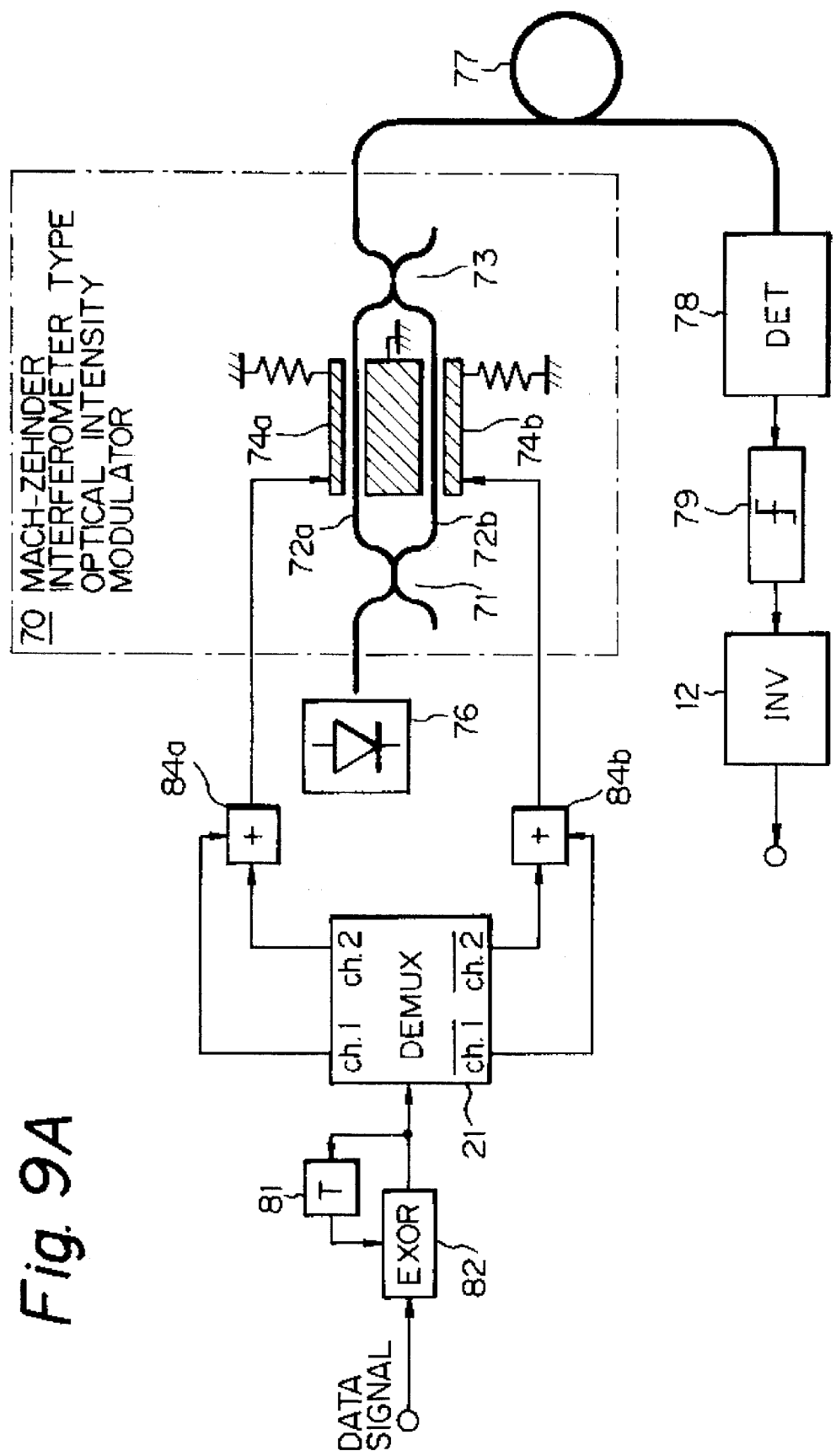
FIG. 9A shows a block diagram of another embodiment of an optical transmission system according to the present invention.

FIG. 9A shows a block diagram of another embodiment of an optical transmission system according to the present invention. The feature of FIG. 9 is the use of a demultiplexer to generate a pair of complementary duobinary signals having opposite phases from a binary data signal.

In the figure, a binary data signal is differentially encoded to a precoded sequence by a one-bit delay line (T) 81 and an exclusive-OR circuit (EXOR) 82, and the precoded sequence is applied to a demultiplexer (DEMUX) 21. The demultiplexer 21 demultiplexes the precoded signal bit by bit, and provides the demultiplexed output together with the inverted data. An adder 84a adds two channels of outputs of the demultiplexer 21, and another adder 84b adds two channels of inverted outputs of the demultiplexer 21. Those adders 84a and 84b provide a pair of complementary duo, binary signals having the same amplitude and opposite phase with each other. Voltage which is proportional to said duobinary signals is applied to a pair of electrodes 74a and 74b of a MZ type optical intensity modulate for 70. The amplitude adjusting circuits 76a and 76b and a bias adjusting circuit 76c are not shown in FIG. 9 for the sake of the simplicity of the figure, but those members are provided in FIG. 9. Other configuration of FIG. 9 is similar to that of the first embodiment of FIG. 1.

Figure 9B:
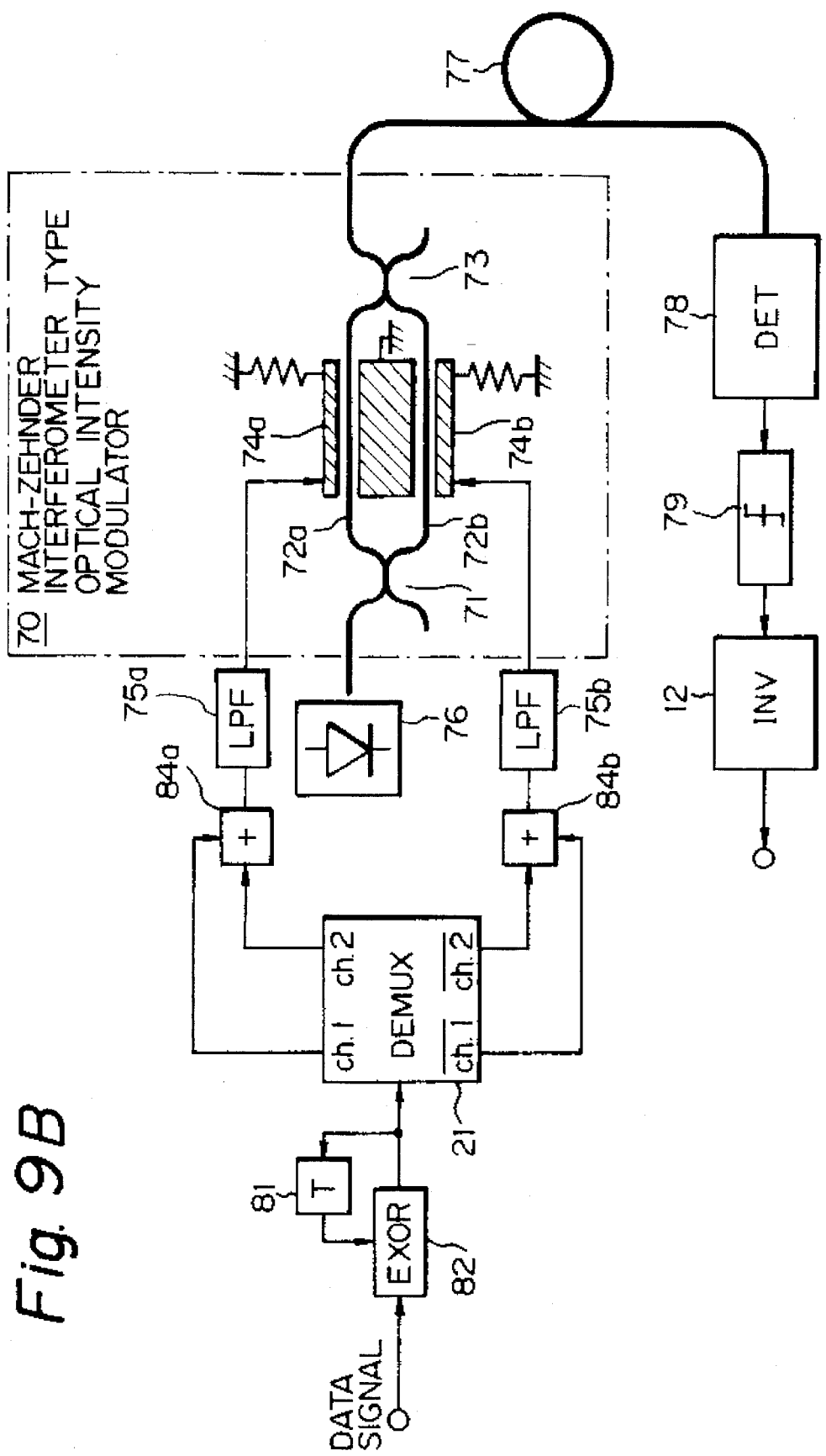
FIG. 9B shows a modification of an embodiment of FIG. 9A.

FIG. 9B is a modification of FIG. 9A. The feature of FIG. 9B is the presence of low pass filters 75a and 75b, as is the case of the embodiment of FIG. 1B, for improving tolerance to the chromatic dispersion.

Figure 10:
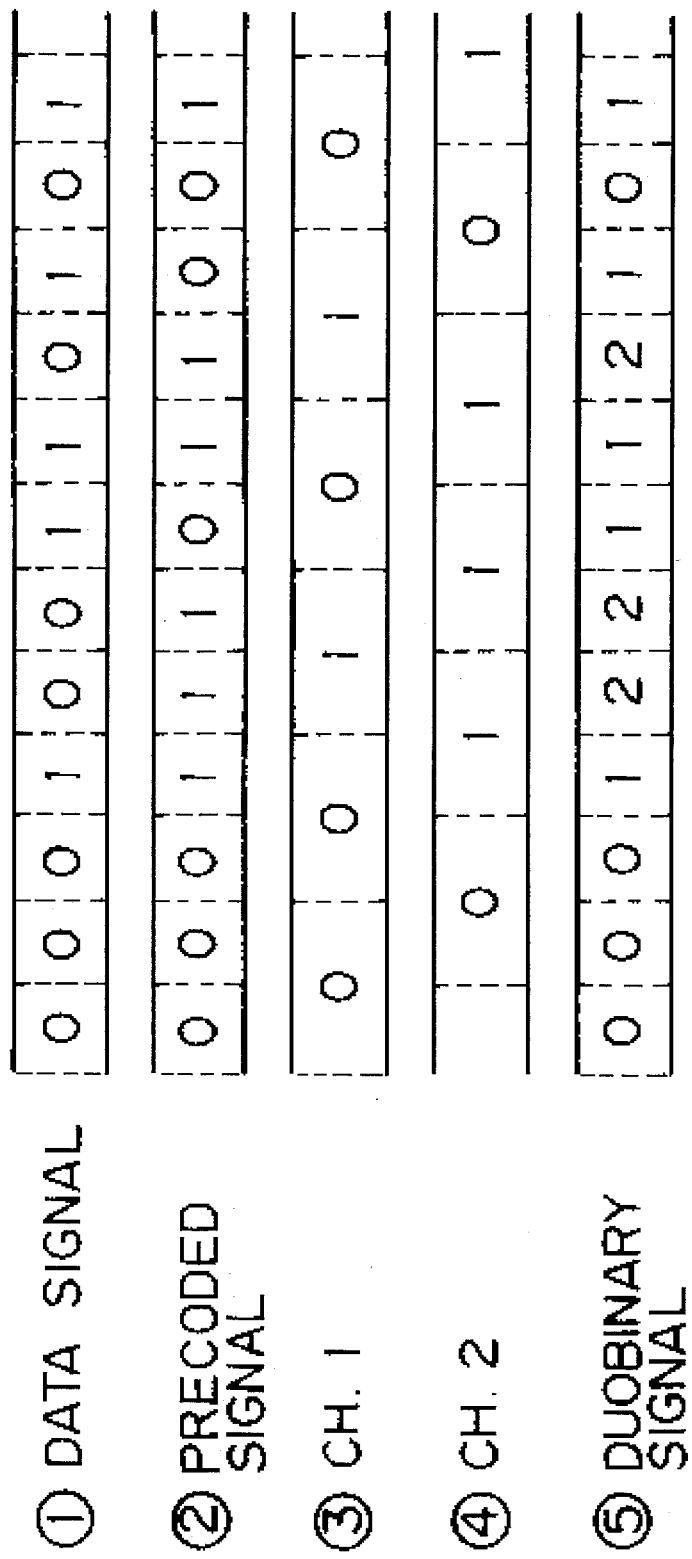
FIG. 10 shows generation of a duobinary signal using a demultiplexer, FIG. 11A show a block diagram of still another embodiment of an optical transmission system according to the present invention.

FIG. 10 shows the operation of a demultiplexer for generation of a duobinary signal. In the figure, (1) shows a

| | | | | | | | | | | | | | | | |
|---|---|---|---|---|---|---|---|---|---|---|---|---|---|---|---|
| (1) $a_k$ | | 0 | 0 | 0 | 1 | 0 | 0 | 1 | 1 | 0 | 1 | 0 | 1 | 1 | 1 | 1 |
| (2) $b_k = a_k \oplus b_{k-1}$ | 0 | 0 | 0 | 0 | 1 | 1 | 1 | 0 | 1 | 1 | 0 | 0 | 1 | 0 | 1 | 0 |
| (3) $d_k = b_k + b_{k-1}$ | | 0 | 0 | 0 | 1 | 2 | 2 | 1 | 1 | 2 | 1 | 0 | 1 | 1 | 1 | 1 |
| (4) dk | | 2 | 2 | 2 | 1 | 0 | 0 | 1 | 1 | 0 | 1 | 2 | 1 | 1 | 1 | 1 |
| (5) $e_k = -\cos(d_k \pi/2)$ | | –1 | –1 | –1 | 0 | 1 | 1 | 0 | 0 | 1 | 0 | –1 | 0 | 0 | 0 | 0 |
| (6) $|e_k|^2$ | | 1 | 1 | 1 | 0 | 1 | 1 | 0 | 0 | 1 | 0 | 1 | 0 | 0 | 0 | 0 |
| (7) $|c_k|^2$ | | 0 | 0 | 0 | 1 | 0 | 0 | 1 | 1 | 0 | 1 | 0 | 1 | 1 | 1 | 1 |

In the sequence (5) in the above table, –1 and 1 show opposite phase, and it should be noted that the detected value of both signals (–1 and 1) by square law means is 1. The table 1 shows an example of operation of encoding and decoding for $2^4-1$ pseudo random bit sequence, and it should be appreciated that similar operation is possible in any other signal sequences.

The experimental result is now described where bit rate is 5 Gbit/s.

Figure 5:
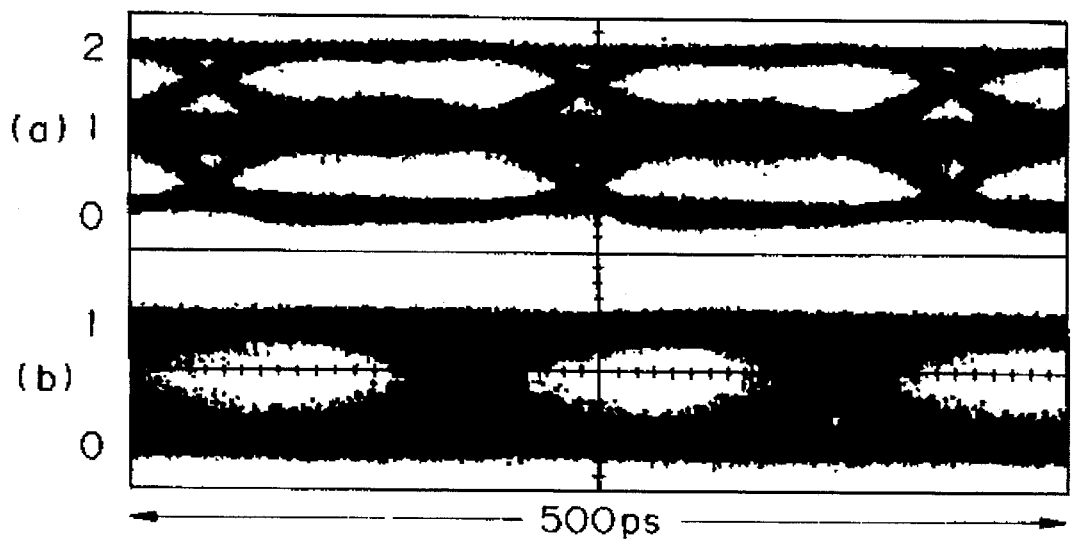
FIG. 5 shows waveform of a duobinary signal, and waveform of a received signal.

FIG. 5(a) shows duobinary signal waveform for driving modulator, FIG. 5(b) shows received signal waveform.

binary data signal, (2) shows a precoded signal, (3) and (4) show outputs of the first channel (ch. 1) and the second channel (ch. 2) of the demultiplexer 21, respectively, and (5) shows a duobinary signal.

Figure 11A:
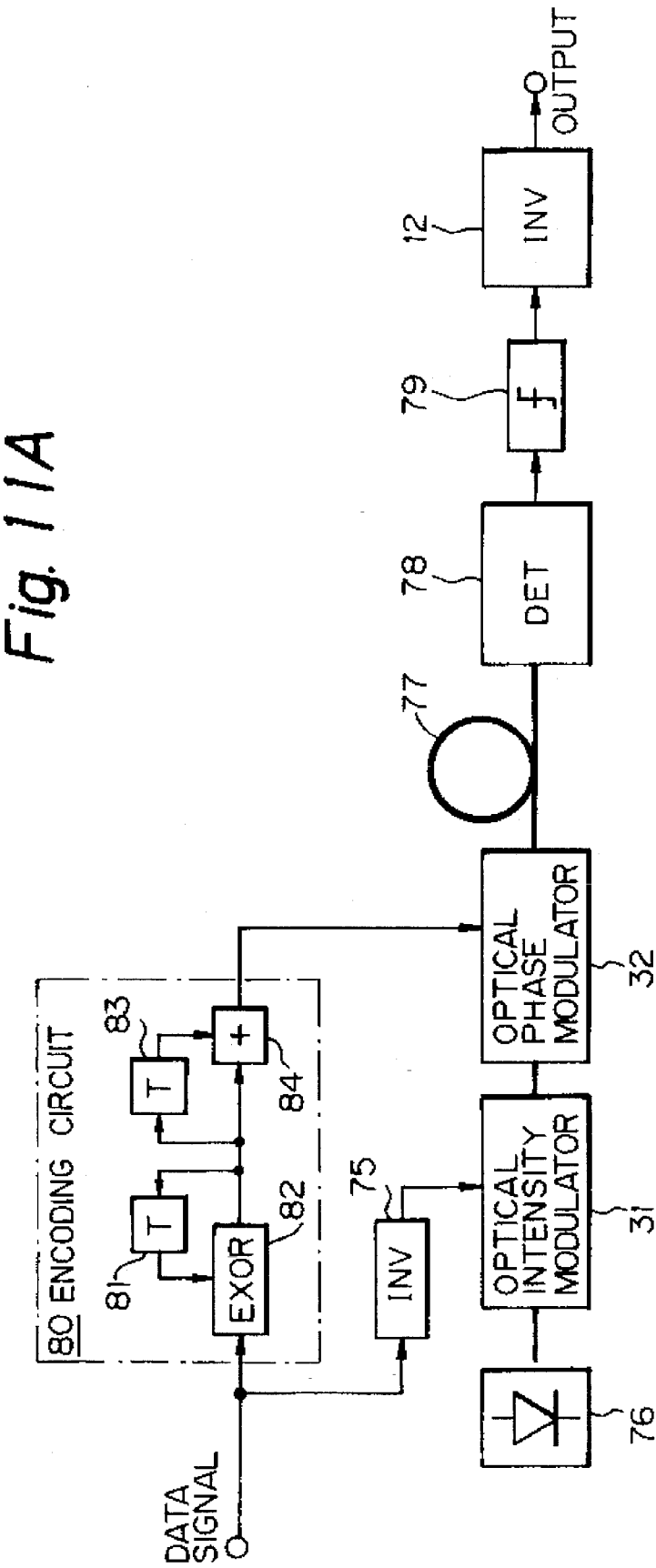
FIG. 11B shows a modification of an embodiment of FIG. 11A.

FIG. 11A shows a block diagram of still another embodiment of an optical transmission system according to the present invention. The feature of FIG. 11 is that an optical intensity modulator and an optical phase modulator are coupled in series, so that inverted binary data signal is applied to said optical intensity modulator, and a duobinary signal which is obtained from a binary data signal is applied to said optical phase modulator. The optical intensity modulator operates in ON-OFF manner, and the optical phase modulator operates to provide phases 0, ¶/2 and ¶.

In FIG. 11A, a binary data signal is applied to a encoding circuit 80, and an inverter 75. An output of a semiconductor laser 76 is applied to an optical intensity modulator 31, which modulates an output of the laser 76 with an output of the inverter 75 which provides inverted binary data signal. The output of the optical intensity modulator 31 is applied to the optical phase modulator 32, which effects phase modulation to the input light with a duobinary signal which is obtained by the encoding circuit 80. The optical intensity modulated signal obtained by the optical intensity modulator 31 and the optical phase modulator 32 is applied to an optical fiber cable 77. The configuration of the encoding circuit 80 is the same as that of FIG. 1A, having one-bit delay lines (T) 81, 83, an exclusive-OR circuit (EXOR) 82, and an adder 84. The configuration of a receiver side is the same as that of FIG. 1A.

Figure 11B:
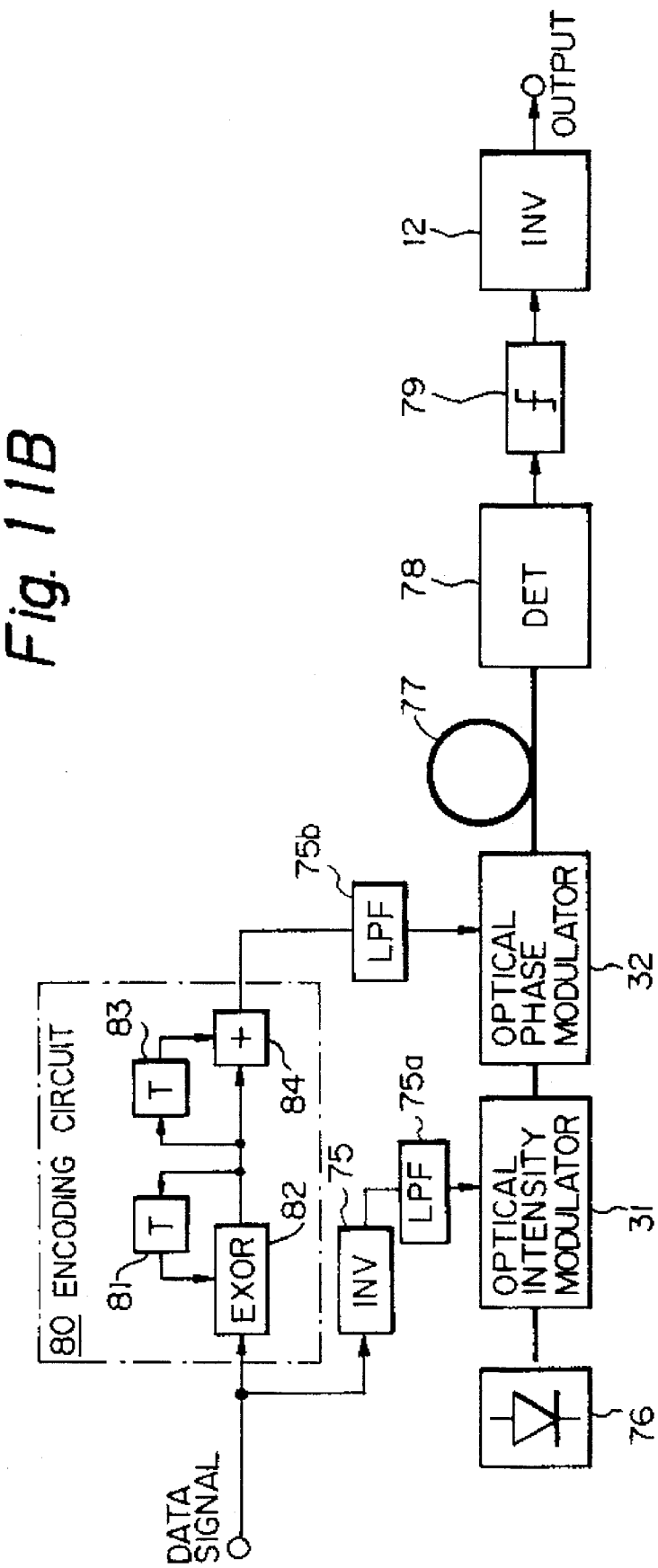
Figure 13:
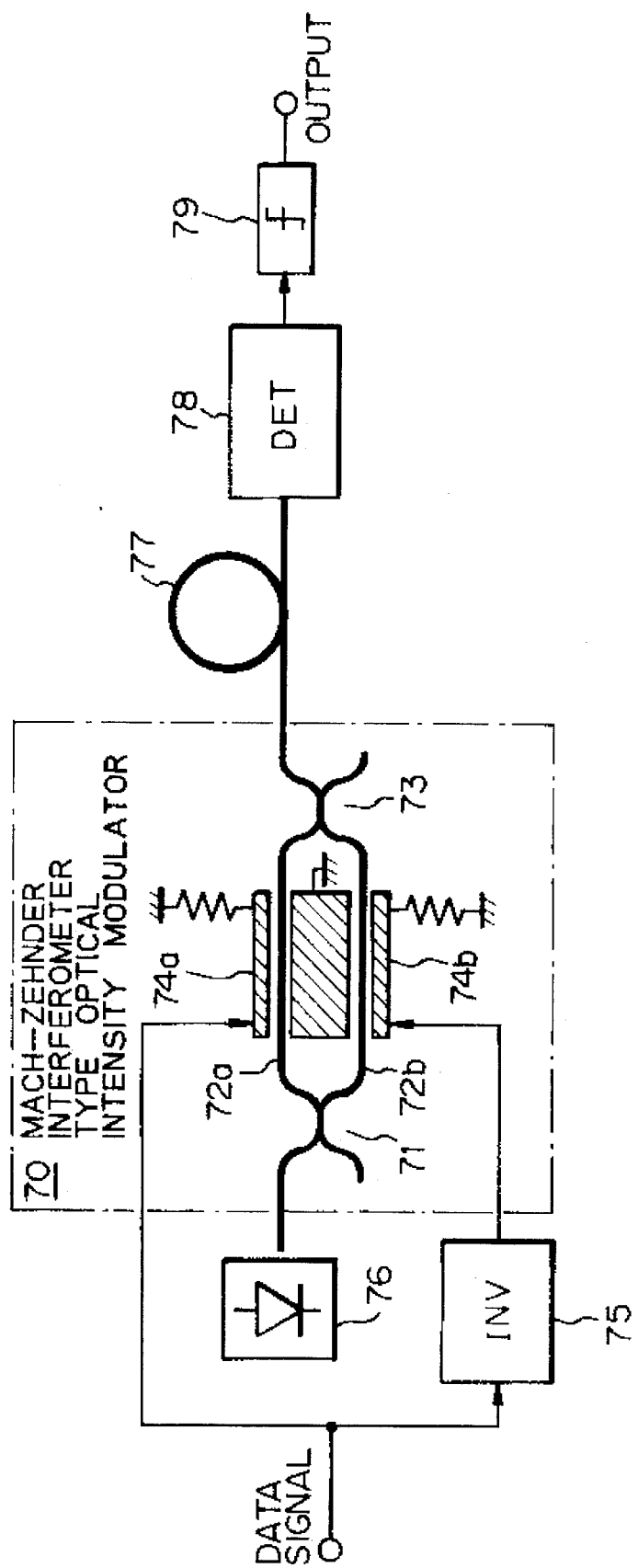
FIG. 13 shows a block diagram of a prior optical transmission system using a MZ type optical intensity modulator.
Figure 14:
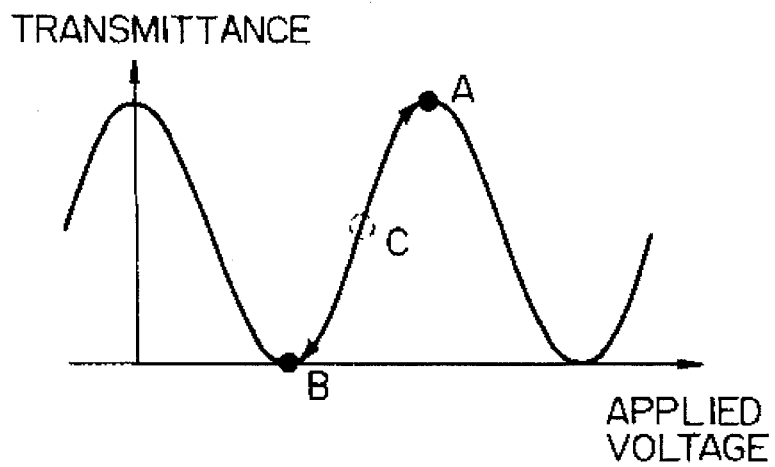
FIG. 14 shows operation of a MZ type optical intensity modulator in a prior art.

FIG. 11B is a modification of FIG. 11A. The feature of FIG. 11B is the presence of low pass filters 75a and 75b, as is the case of FIG. 1B for improving tolerance the to chromatic dispersion.

FIG. 12 shows operation of an optical intensity modulator 31 and an optical phase modulator 32. Values "0", "1" and "2" of a duobinary signal applied to the optical phase modulator 21 correspond to optical intensity "1", "0" and "1", respectively, and optical signal of intensity "1" corresponding to "0" and "2" of a duobinary signal have the opposite optical phase with each other. The modulated output of FIG. 11 is the same as that of FIG. 1, and therefore, a demodulation is carried out by inverting a directly detected signal at a receiver.

As mentioned above in detail, according to the present optical transmission system, carrier frequency component in signal spectrum is suppressed without deteriorating receiver sensitivity, and simple configuration of a receiver is obtained. Therefore, the restriction of input power into an optical fiber due to stimulated Brillouin scattering is relaxed, and crosstalk due to four-wave mixing in optical wavelength-division multiplexed transmission system is decreased. Further, as bandwidth is halved as compared with that of a conventional optical intensity modulation using a binary signal, the effect of chromatic dispersion of an optical fiber is decreased, and frequency utilizing efficiency is improved in an optical wavelength-division multiplexed transmission system. Thus, the present invention improves the transmission capacity, the transmission rate, and/or the transmission distance, which were restricted by chromatic dispersion and/or non-linearity of an optical fiber in a prior art.

From the foregoing, it will now be apparent that a new and improved optical transmission system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An optical transmitter system comprising;
   an input terminal receiving a binary data signal,
   an encoding circuit coupled with said input terminal for converting a binary data signal to a duobinary signal,
   an optical modulation means coupled with an output of said encoding circuit for providing optical intensity modulation to an optical carrier with said duobinary signal so that optical intensity of a modulated light for a center value of said duobinary signal is the minimum and optical intensity of the modulated light for other two values of said duobinary signal is the maximum, and phase of the modulated light for those two values is opposite with each other, and
   an output terminal coupled with output of said optical modulation means to provide a modulated optical signal to an optical transmission line.

2. An optical transmitter system according to claim 1, wherein said optical modulation means provides modulated output with level zero as said minimum output for said center value of said duobinary signal.

3. An optical transmitter system according to claim 1, wherein said optical modulation means comprises;
   an optical source for providing optical carrier,
   a modulator driving signal generation means for providing a pair of complementary modulator driving signals having the same amplitude and opposite phase as each other according to a value of said duobinary signal,
   a Mach-Zehnder interferometer type optical intensity modulator for modulating intensity of said optical carrier by both of said modulator driving signals,
   wherein said modulator modulates output of said optical source so that intensity of a modulated light is the minimum when said modulator driving signal is at center value and it is the maximum when said modulator driving signal is at other two values, and phase of an output light for those two values is opposite with each other.

4. An optical transmitter system according to claim 1,
   wherein said encoding circuit comprises means for dividing a binary data signal to two signals, means for converting one of divided signals to duobinary signal, and means for providing an inverted signal by inverting another of divided signals, and
   said optical modulation means comprises;
   an optical source for providing optical carrier,
   an optical intensity modulator for intensity modulation of said optical carrier according to said inverted signal,
   an optical phase modulator for modulating the phase of output light of said optical intensity modulator according to said duobinary signal,
   wherein optical intensity for a center value of said duobinary signal is the minimum and optical intensity for other two values of said duobinary signal is the maximum, and optical phase for two values which provide the maximum optical intensity is opposite with each other.

5. An optical transmitter system according to any one of claims 1-4, wherein a low pass filter is provided between an output of said encoding circuit and an input of said optical modulation means for restricting bandwidth of optical intensity modulated signal in the present invention.

6. An optical transmission system comprising an optical transmitter system as recited in any one of claims 1-4; an optical receiver system for providing demodulated binary signal, and an optical transmission line coupling said optical transmitter system and said optical receiver system.

7. An optical transmission system according to claim 6, wherein said optical receiver system comprises an optical detection circuit for direct detection of received optical signal, a decision circuit coupled with output of said optical detection circuit for deciding each values of binary signal, an inverter for inverting output of said decision circuit, and an output terminal coupled with output of said inverter to provide demodulated binary signal.

\* \* \* \* \*